US011138226B2

(12) United States Patent
Shmueli et al.

(10) Patent No.: US 11,138,226 B2
(45) Date of Patent: Oct. 5, 2021

(54) MOVING REPLICATED DATA IN A CLOUD ENVIRONMENT

(71) Applicant: Technion Research and Development Foundation Ltd., Haifa (IL)

(72) Inventors: Oded Shmueli, Nofit (IL); Itai Shaked, Jerusalem (IL)

(73) Assignee: Technion Research and Development Foundation Ltd., Haifa (IL)

( * ) Notice: Subject to any disclaimer, the term of this patent is extended or adjusted under 35 U.S.C. 154(b) by 72 days.

(21) Appl. No.: 16/603,563

(22) PCT Filed: Apr. 5, 2018

(86) PCT No.: PCT/IL2018/050404
§ 371 (c)(1),
(2) Date: Oct. 7, 2019

(87) PCT Pub. No.: WO2018/185771
PCT Pub. Date: Oct. 11, 2018

(65) Prior Publication Data
US 2020/0042534 A1 Feb. 6, 2020

Related U.S. Application Data

(60) Provisional application No. 62/482,243, filed on Apr. 6, 2017.

(51) Int. Cl.
*G06F 16/23* (2019.01)
*G06F 16/27* (2019.01)
(Continued)

(52) U.S. Cl.
CPC .......... *G06F 16/27* (2019.01); *G06F 16/2282* (2019.01); *G06F 16/2343* (2019.01); *G06F 16/2365* (2019.01); *G06Q 10/06315* (2013.01)

(58) Field of Classification Search
CPC ............. G06F 16/1774; G06F 16/2282; G06F 16/2343; G06F 16/2365; G06F 16/27; G06F 3/0647
See application file for complete search history.

(56) References Cited

U.S. PATENT DOCUMENTS 6,622,259 B1  9/2003  Schmuck
7,058,731 B2  6/2006  Kodoma
(Continued)

FOREIGN PATENT DOCUMENTS

WO   WO 2017/004157   1/2017

OTHER PUBLICATIONS

International Search Report and Written Opinion dated Jul. 15, 2018 in International Application No. PCT/IL2018/050404.
(Continued)

*Primary Examiner* — Merilyn P Nguyen
(74) *Attorney, Agent, or Firm* — Knobbe, Martens, Olson & Bear, LLP

(57) ABSTRACT

Systems and methods are provided for moving replicas of a target data object between a plurality of storage nodes that store multiple replicated data objects, by setting new applications to a move mode, waiting for prior applications to exit before moving the target data object, determining that an indication of access to the target data object is done, and responsively copying the replicas of the target data object from first locations among the plurality of data storage nodes to second locations among the plurality of storage nodes.

19 Claims, 6 Drawing Sheets

(51) Int. Cl.
　　　*G06F 16/22*　　　(2019.01)
　　　*G06Q 10/06*　　　(2012.01)

(56) References Cited

U.S. PATENT DOCUMENTS

| | | | |
|---|---|---|---|
| 10,083,199 B1* | 9/2018 | Sharma | G06F 3/067 |
| 2002/0038301 A1* | 3/2002 | Aridor | G06F 9/465 |
| 2003/0037029 A1* | 2/2003 | Holenstein | G06F 16/273 |
| 2006/0031594 A1 | 2/2006 | Kodama | |
| 2010/0191884 A1* | 7/2010 | Holenstein | G06F 11/2094 |
| | | | 710/200 |
| 2012/0137098 A1 | 5/2012 | Wang et al. | |
| 2013/0326546 A1* | 12/2013 | Bavishi | G06F 16/119 |
| | | | 719/328 |
| 2014/0025770 A1* | 1/2014 | Warfield | G06F 16/256 |
| | | | 709/213 |
| 2019/0205244 A1* | 7/2019 | Smith | G06F 12/12 |
| 2019/0251097 A1* | 8/2019 | Shmueli | G06F 9/52 |

OTHER PUBLICATIONS

International Preliminary Report on Patentability for PCT/IL2018/050404 dated Oct. 8, 2019 in 8 pages.

\* cited by examiner

| Tuple ID | Location in Effect | Odd Group | Even Group | Odd Locations | Even Locations | Move Lock | AccessL (reader, locations) | TamperL updaters | Move Wait |
|---|---|---|---|---|---|---|---|---|---|
| 1217 | odd | 16 | 7 | L1, C1, C2 | L1, C2, C3 | none | none | none | 0 |
| 1218 | even | 16 | 5 | L1, C1, C2 | L2, C2, C4, C5 | move | (Process 2434,C1) (Process 2409, C2) | none | 0 |
| 1220 | even | 16 | 7 | L1, C1, C2 | L1, C2, C3 | move | none | Process 2000 | 0 |
| ... | ... | ... | ... | ... | ... | ... | ... | ... | ... |

FIG. 2

MOVING REPLICATED DATA IN A CLOUD ENVIRONMENT

CROSS REFERENCE TO RELATED APPLICATION

This application is a national phase entry of International Patent Application No. PCT/IL2018/050404, filed Apr. 5, 2018, which claims the benefit under 35 U.S.C. § 119(b) to U.S. Provisional Patent Application No. 62/482,243, filed Apr. 6, 2017, entitled "Object Moving in a Replicated Cloud Environment", the contents of which are incorporated herein by reference in their entirety.

FIELD OF THE INVENTION

The present invention is directed to systems and methods for managing distributed memory storage systems.

BACKGROUND

In many distributed computing systems, objects are replicated for survivability, efficiency and other reasons. Objects may be any type of data, ranging from a bit, a byte, a file, a database of portions thereof, an Extensible Markup Language (XML) element or document, a JavaScript Object Notation (JSON) document or portions thereof, a relational field, relation or database, etc.

A basic problem that has been extensively researched is that of concurrency control over replicated objects. Work on managing replicas and obtaining consistency in the field of NOSQL databases includes: Robbie Strickland, "Cassandra High Availability", 2014. Earlier work includes P. A. Bernstein, V. Hadzilacos, and N. Goodman, Concurrency Control and Recovery in Database Systems, 1987, (on-line at: https://www.microsoft.com/en-us/research/people/philbe).

The storage locations of copies of a replicated object may need to be changed from time to time to improve system performance or to improve other parameters of operation, such as cost and security.

SUMMARY

It is an object of the present invention to provide systems and methods to efficiently move replicated, distributed data objects. Aims of an efficient move include reducing the disruption to user applications and establishing new data locations as quickly as possible. Effectively balancing these aims is also a goal of the present invention.

Embodiments of the present invention provide a networked computing system including at least one processor and a communicatively coupled memory storing instructions that when executed by the at least one processor perform steps of a move operation to move a target object, stored at multiple first storage locations, to multiple second storage locations. The first and second storage locations may store a plurality of objects, and the plurality of objects are may be accessed by user applications. The steps of the move operation may include: triggering a move application to implement the move operation and setting new user applications that are initiated during the move operation to a move mode whereby, upon accessing any of the plurality of objects, the new user applications set an access indication to notify the move application of the access; waiting for prior user applications, initiated before triggering the move operation, to exit before copying the target object to the multiple second storage locations; subsequently copying the target object to the second storage locations; and subsequently cancelling the move mode of the new user applications.

In further embodiments, copying the target object may include determining that there is an access indication set for the target object and waiting for the access indication to be cleared before copying the target object.

Also in further embodiments, triggering the move application may include determining that a system performance parameter meets a move criterion such that moving the target data object improves at least one of an access delay time, a data security level, a corporate policy for replication, a cost, or other important business parameters.

In further embodiments, the target object may include a plurality of target objects, each stored at multiple first storage locations, and cancelling the move mode may include waiting to cancel the move mode until all the plurality of target objects are copied to new storage locations.

In a conservative mode of the move operation, after the prior user applications exit, the new user applications abort upon attempting to read from or write to the target object.

In a first optimistic mode of the move operation, after the prior user applications exit, the new user applications set a read indication when reading from the target object; the move application, before copying the target object, sets a lock to prevent concurrent write access by the new user applications; and, after copying the target object to the second storage locations, the move application cancels the lock, after determining that there are no read indications set for the target object.

In a second optimistic mode of the move operation, after the prior user applications exit, the new user applications, when writing to the target object, first wait for the move application to copy the target object if there is a current move indication. In addition, when waiting to write, a given new user application aborts upon determining that the move application is waiting for an access indication set by the given new user application with respect to a second target object.

In a third optimistic mode of the move operation, after the prior user applications exit, the new user applications, when writing to the target object, first set a Write-Lock; the move application, upon detecting the Write-Lock, stops copying the target object; the new user applications, after writing to the target object, set a done indication; and the move application, responsively to the done indication, copies the updated target object to all of the second storage locations.

In some embodiments, cancelling the move mode of the user applications further includes: updating a location indicator of the target object to indicate that the second storage locations are current locations; and deleting data and reclaiming storage space at the first storage locations.

There is further provided, by embodiments of the present invention, a computer-based method for performing steps of a move operation to move a target object, stored at multiple first storage locations, to multiple second storage locations, the first and second storage locations storing a plurality of objects, the plurality of objects being accessed by user applications. The steps of the move operation may include: triggering a move application to implement the move operation and setting the user applications that are initiated during the move operation to a move mode whereby the user applications, upon accessing any of the plurality of objects, set an access indication to notify the move application of the access; waiting for prior user applications, initiated before triggering the move operation, to exit before copying the target object to the multiple second storage locations; subsequently copying the target object to the second storage locations; and subsequently cancelling the move mode of the user applications.

BRIEF DESCRIPTION OF DRAWINGS

In the following detailed description of various embodiments, reference is made to the following drawings that form a part thereof, and in which are shown by way of illustration specific embodiments by which the invention may be practiced, wherein:

FIG. 2 shows a format of a table for supporting the movement of replicated, distributed data objects, according to embodiments of the present invention;

DETAILED DESCRIPTION OF THE INVENTION

In the following detailed description of various embodiments, it is understood that other embodiments may be utilized and structural changes may be made without departing from the scope of the present invention.

In embodiments of the present invention, a distributed computing system provides applications with access to replicated data objects, that is, to objects that are maintained as multiple copies, or replicas, at different storage locations in the computing system. Such objects are also referred to hereinbelow as "tuples". If so instructed, the system applies methods known in the art for ensuring consistency across the multiple replicas when replicas are accessed by applications. In particular, the system applies known mechanisms for ensuring that an update (i.e., write) to one replica is propagated to other replicas before a subsequent read is performed from any replica.

The system is further configured to automate a selection of storage locations for storing replicas of an object. Embodiments of the present invention furthermore provide for moving an object, having replicas stored at multiple locations, to multiple new locations, while allowing varying levels of concurrent access to replicas by applications.

Figure 1A:
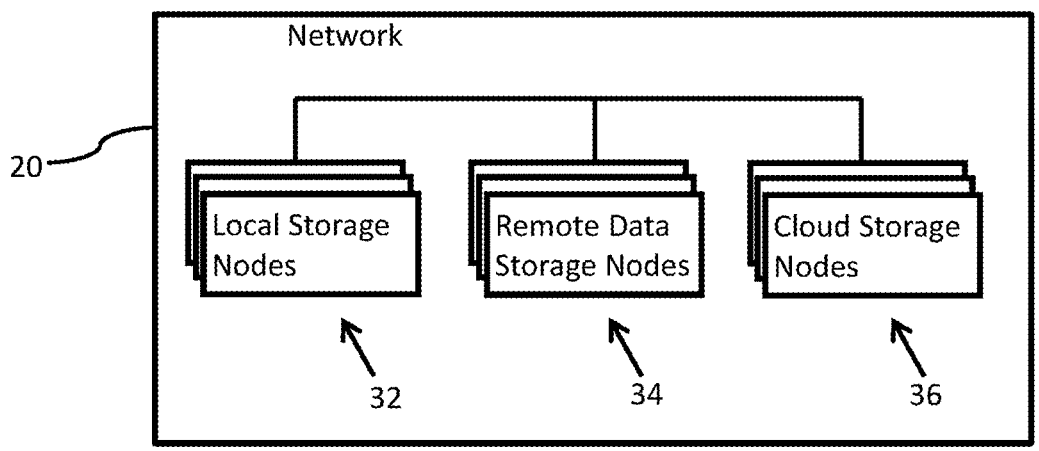
FIGS. 1A and 1B show schematic, pictorial illustrations of a system configured for moving replicated, distributed data objects, according to embodiments of the present invention.
Figure 1B:
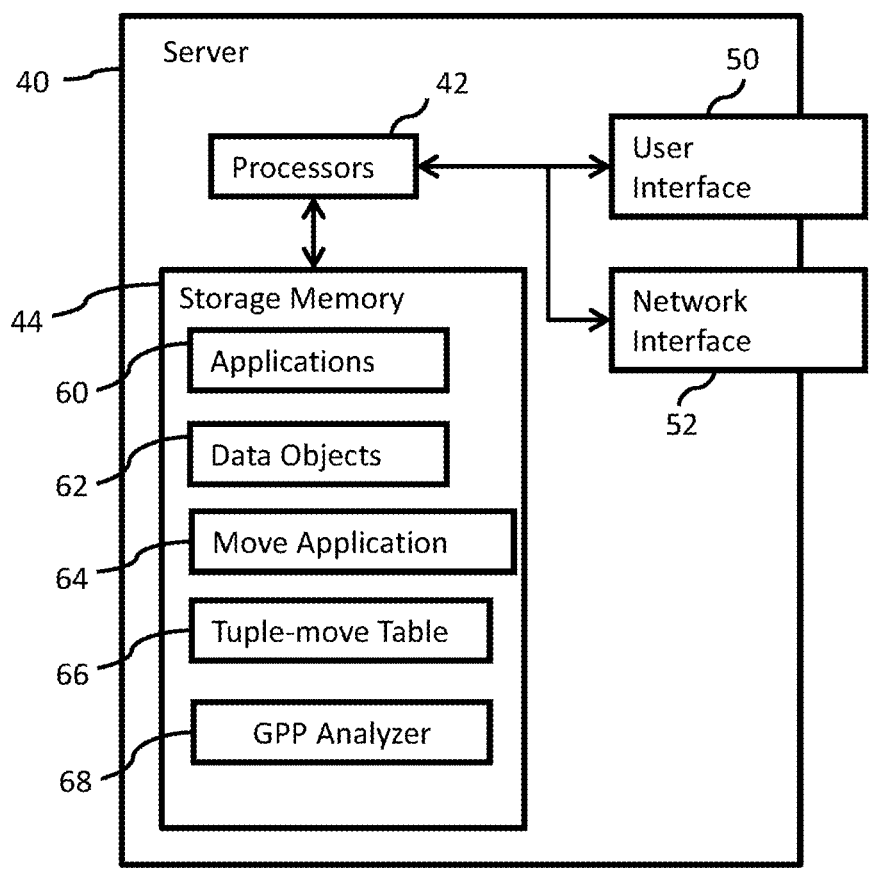

FIGS. 1A and 1B show schematic, pictorial illustrations of a system 20 configured for moving replicated, distributed objects, according to embodiments of the present invention. System 20 may include several networked computer sites. These may include: local storage nodes 32 at a local installation, which may be a local corporate installation; remote storage nodes 34 at a remote installation, which may include servers, private corporate storage arrays, etc.; and cloud storage nodes 36 at a cloud installation. The system may include more than one of each type of installation. Objects stored at the different storage nodes may be replicated partially or fully on other nodes, that is, objects may reside exclusively in one of the installations or in two or more. Also, within a single installation, objects may be replicated at different locations of multiple storage nodes.

A typical storage node of system 20 may include a server 40, which includes one or more processors 42, storage locations 44, a user interface 50 and a network interface 52, over which applications of the multiple nodes communicate. The storage locations 44 may store a move application 64, which manages the move operations described below. Also stored at the storage locations 44 may be one or more of a subset of applications 60 and a subset of objects 62, where references to the applications 60 and the objects 62 are meant to refer to all respective applications and objects stored and addressable throughout system 20. Applications of the system 20, include all processes, programs, etc., that access the objects. Applications that are not the move application are also referred to hereinbelow as "user applications", that is, all applications that access objects, other than the move application.

Storage locations are typically mapped by file systems of system 20 to enable applications 60 to access objects 62. Hereinbelow, the term "access" is meant to apply to both read access and write access. The system typically implements mechanisms known in the art for permitting applications to access replicas of objects, such as directing access according to preset network mappings.

The move application may include a mechanism, such as a registry, for tracking notifications sent and received from applications, as described below, for managing a move operation. Such a registry may be a tuple-move table 66. The move application may also operate in conjunction with a goal program policy (GPP) analyzer 68, as described further hereinbelow. The user interface 50 may be used to characterize access parameters of the various objects and to define constraints and criteria for move operations.

In some embodiments, locations for storing replicas of data objects are determined in such as way so as to optimize corporate access policies, as disclosed in International Patent Publication No. WO 2017/141249, to the inventor of the present invention, the contents of which are incorporated herein by reference in their entirety. Tuples may be designated by S, U, R, and F access parameters, which are set by management rules, where S denotes a target security level (1-10), U denotes a target response time for invoking a data object, R denotes a replication level, and F denotes a frequency of access. Corporate policies may further be defined in terms of an allotted budget, storage needs, storage capacities, storage costs, and tradeoffs between these factors. In parallel, operating parameters such as frequency of access and communication performance may be measured for storage at different locations of the different system installations, determining, for example, average delays for applications to access data objects running on different nodes. The goal program policy (GPP) analyzer 68 is typically an algorithm for optimizing replica locations according to the corporate policies and the storage operating parameters described above. The GPP may be configured as a mixed integer linear optimization problem, which may be solved with tools such as a Linear/Quadratic Integer Programming (LIP) package, such as the LINDO API or the Gurobi™ Optimizer.

As described in the aforementioned Publication No. WO 2017/141249, during the course of operation of a distributed computing system, factors such as pricing, system performance, and data needs may change as an organization's operations change and as data objects and applications are added and removed. Such changes may lead to a determination by the GPP algorithm that a change in a system performance parameter may be improved by moving one or more tuples to new locations. The determination by the GPP analyzer 68 typically involves determining that a potential improvement in a system performance parameter meets a predefined move criterion, such as exceeding a predefined threshold. When such a determination is made, the GPP analyzer 68 may trigger execution of the move application 64, which implements a move operation described further hereinbelow. Alternatively, the move application 64 may be triggered manually by a human operator through the user interface 50 (for many operational reasons).

For greater efficiency, data objects may be grouped, such that replicas of grouped data objects are all located at the same collection of storage locations. That is, objects in a group are replicated in the same set of locations. The GPP analyzer 68 may determine that a subset of a group should be moved to the locations of a different group.

FIG. 2 shows a format of the tuple-move table 66 for supporting an operation of moving tuples, according to embodiments of the present invention. The table shows several rows that are intended to be merely illustrative of the type of data maintained during the move operation, data which is communicated between the move application 64 and the applications 60. Physically, the data in the tuple-move table may be stored in many formats, such as multiple relational tables in normal form. The tuple-move table may be stored in one or in multiple storage locations, and may rely for consistency on appropriate data consistency mechanisms known in the art. Flags, locks, and other data recorded to the table may also be implemented by other forms of messaging between applications, one example being the ZooKeeper™ distributed coordination system from the Apache Software Foundation.

Each row of the tuple-move table 66 indicates parameters related to a given tuple (i.e., data object). Shown in the figure are three exemplary rows, defining parameters of three respective exemplary tuples. Rows may include the following fields:

1: An identifier (Tuple ID) of the given tuple. The first tuple listed in the figure has, for example, an ID of "1217".

2: An "Location in effect" indicator, or flag, indicating whether valid data locations are those locations labeled "odd" or those labeled "even". The first tuple listed in the figure has, for example, an "in effect" value of "odd", meaning that applications that access the tuple should access the "odd" locations. After a move, the "in effect" flag is set to indicate the new (or "current") storage locations of a tuple. The data at the old locations is typically deleted.

3: An "Odd Group" number—an identifier of the group to which the tuple belonged when the "in effect" flag indicated the set of "odd" locations.

4: An "Even Group" number—an identifier of the group to which the tuple belonged when the "in effect" flag was set of "even" locations. A group, as described above, generally defines a set of locations, at which may be stored multiple replicas of multiple respective tuples. The three exemplary tuples in the example tuple-move table all have an "odd" group of 16, whereas tuple 1218 has an "even" group that is different than that of the other two tuples. As the three rows indicate, tuples may sometimes be moved together to a new group, or may be moved to a new group independently of other tuples in their current group.

5: A list of the "odd locations" indicated by the "odd" group number. For tuple 1217, three locations are listed, L1, C1, and C2. (These may be abbreviations of locations such as local node 1, cloud node 1, and cloud node 2.)

6: A list of the "even locations" indicated by the "even" group number.

7: "Move-Lock", a flag indicating that the move application 64 is currently copying the replicas of the given tuple to new locations. That is, the flag is typically a binary value, indicating a move or no move ("none").

8: "AccessL": This field is typically a list of applications reading from a given replica at a given moment. It may be set to "none" when there are no applications reading from the given tuple. The AccessL field of the second exemplary tuple 1218 shown in the table indicates that currently two application processes are reading from replicas of the tuple: an application with process number 2434, which is reading from location C1, and an application with process number 2409, reading from location C2. (Application numbers may indicate the physical environment in which the process is running, as well as a process number of the application, as recorded by the operating system, as well as an identification of the operating system itself, in case of virtualization.)

9: "TamperL": This field is typically a list of user applications writing to a given tuple at a given moment (typically limited to one process). The field may be utilized as an indicator of write access, which may also be a type of lock indicator (a Write-Lock), described further hereinbelow. The field may be set to "done" by a user application after a write, to indicate to the move application that an update has occurred (if there are no other writers recorded in TamperL). The field may be reset to "none" or "null" by the move application when the move of the tuple is complete. (In case no other writer is recorded in TamperL, and TamperL was "none" when the writer was recorded in TamperL, the field TamperL may also be reset to "none" or "null" by the writer. This would occur when the user application, i.e., writer, set the Write-Lock intending to write to the tuple, but then completed the write operation without changing the tuple.) The TamperL field of the third exemplary tuple 1220 shown in the table indicates that currently one application is writing to the tuple: having process number 2000. Standard known mechanisms for preserving consistency during writes may be implemented, separately from the registering of access in the tuple-move table 66, or by means of additional fields in the table.

10: "Move-Wait": a flag set by the move application 64, indicating that the move application is currently waiting before beginning to copy the replicas of the given tuple.

The meanings of these different fields will be further clarified from their use, as described with respect to the flow diagrams in FIGS. 3-6. It should be noted that the Move-Lock, AccessL, TamperL, and Move-Wait fields, in particular, are fields through which the move application and the user applications indicate to each other their current access usage of a given tuple. Other methods of signaling access usage may also be implemented, such as maintaining the field information in internal memory of the move application, which may communicate the information to the user applications through a messaging mechanism.

Figure 3:
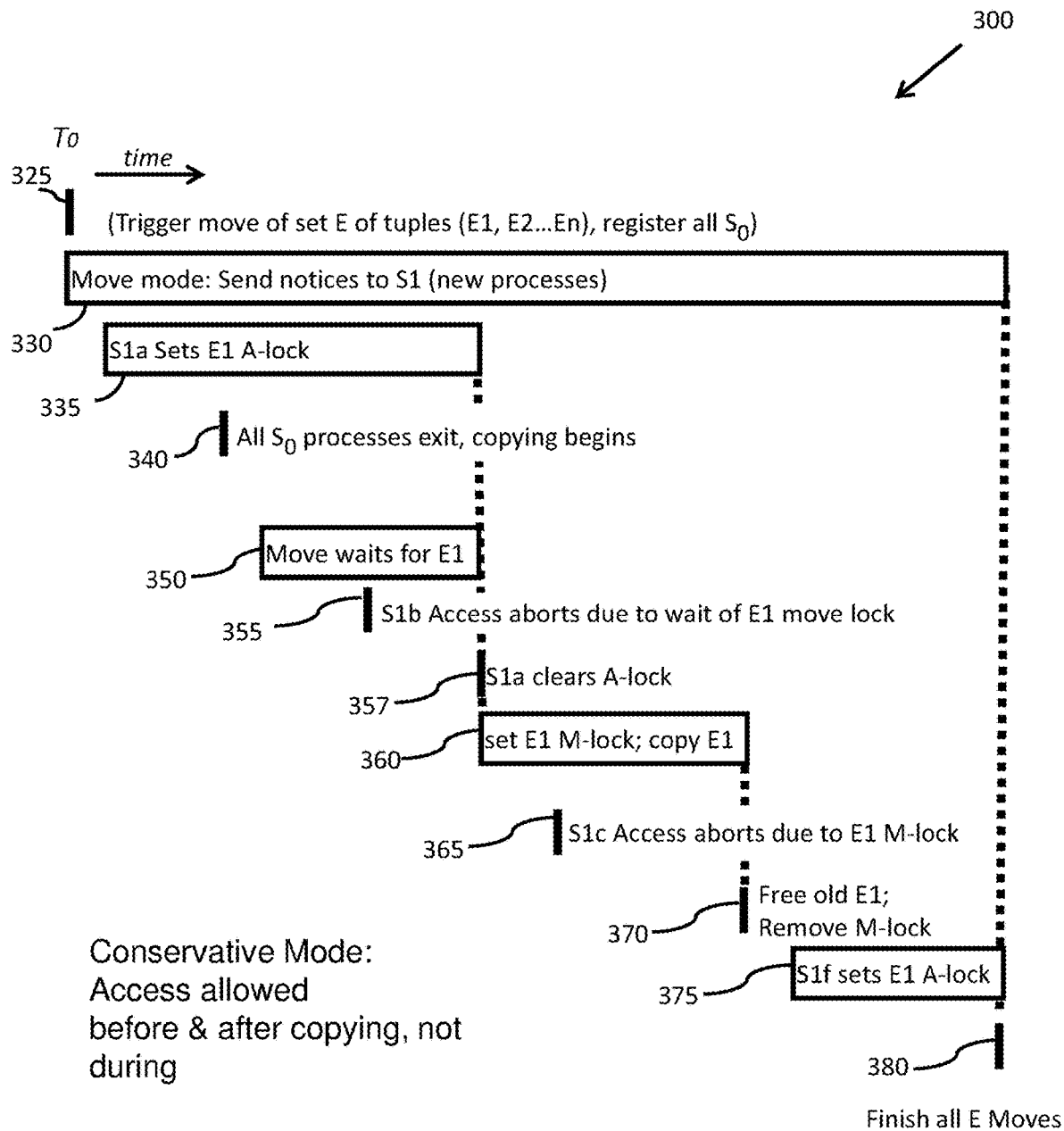
FIG. 3 shows a schematic flow diagram of a conservative process for moving replicated, distributed data objects, according to embodiments of the present invention.

FIG. 3 shows a schematic flow diagram of a process 300 for moving replicated, distributed data objects, according to embodiments of the present invention. Process 300, as well as the additional processes 400, 500 and 600, illustrated in FIGS. 4-6 below, are processes for moving tuples while also permitting varying degrees of concurrent access to the tuples by applications 60. The steps of the processes that are described include steps performed by both the move application 64, and by the applications 60, as noted for each step.

The process 300 is considered a conservative process, compared with processes 400, 500 and 600, because applications have only a limited period of access to tuples during the process.

All of the processes described below begin with a trigger step 325, which occurs at a time indicated as $T_0$. Typically, the trigger is initiated when the GPP analyzer 68 identifies multiple tuples that should be moved, as usually the movement of a single tuple may not satisfy the move criterion. The set of tuples to move, also referred to herein as the set of "target data objects", is indicated as "E", each individual tuple of E being designated by a numeric indicator, such as E1, E2, etc.

At the time of the trigger 325, the move application 64 is typically initiated and begins by registering the set of all currently running applications, indicated as the set $S_0$. That is, $S_0$ includes all applications ("user applications") that were initiated prior to the trigger. The $S_0$ applications, also referred to herein as "prior user applications" have not been indicating their access of objects in the tuple-move table. Because the consistency of objects during the move operation requires that access be recorded, as described below, the prior applications must exit before the move application 64 can begin moving tuples.

In addition to registering currently running applications, the move application 64, at a step 330, also begins to set all new applications (indicated as a set S1) to operate in a "move mode". That is, each new application that begins to operate after the move trigger 325 is set to operate in move mode, until all tuples have been moved to their new locations and the move mode is cancelled.

The steps of indicating (or "registering") access to objects, that is, the steps that applications perform during a move operation, as described below, are not needed during normal operation of the system. Assuming that move operations as described herein occur relatively infrequently, significant processing overhead is conserved by setting applications to operate in a "move mode" only when a move operation is actually occurring. Applications are typically programmed (that is "preconfigured"), by default, to operate in a normal mode and to operate in the move mode only during a move operation.

As noted above, the process 300 may be considered a "conservative" move process, such that the user applications set to a move mode at the step 330 may be considered to be operating in a "conservative move mode", and the move application itself also operates in a "conservative move mode". Differences between this mode and the modes of the processes 400, 500 and 600 are described below with respect to FIGS. 4-6. The move mode, that is, the type of process to be performed for a move operation, may be manually changed during system operation. Alternatively, the system may be automated to change the mode on an on-going basis according to various corporate criteria.

While prior user applications (that is, applications in the set $S_0$) continue to operate, access to the target tuples by both prior and new user applications is allowed; however, the new applications, which are set to the "move mode", must register their access of tuples in the move-tuple table 66. New user applications generally record read access in the AccessL field. Write access at this stage may also set the AccessL field. (Consistency of tuple replicas may be being managed by known replicated data operations.) When AccessL is set, it is also referred to hereinbelow as an A-Lock. Multiple simultaneous accesses (at least multiple read accesses) are permitted. An example of a new user application access at this stage is indicated as a step 335, indicating that a user application, S1a, has written to the AccessL field while reading from the tuple E1.

At a point 340, all prior user applications have exited (that is, the last of these applications exits at this point in time). At this point, the move application can begin to move tuples to their new locations. However, some tuples may be A-Locked by user applications. For example, tuple E1 is still A-Locked at point 340 by the application S1a. At a step 350, the move application checks the A-Lock field (i.e., AccessL) before starting to move the tuple E1, and, due to the lock, the move application waits for the A-Lock to be released by S1a. (Alternatively, the move application could proceed to handle other tuples, rather than waiting for an A-Locked tuple to be released. This alternative raises the possibility of "livelocks", which require an additional mechanism for livelock detection and resolution.)

As noted above, multiple applications may have simultaneous A-Locks set on E1. Each application that finishes clears its process number from the list in the AccessL field and sets the field to "none" if it is the last application to finish. This clearing may also be done by the system on behalf of the application.

While the move application is waiting, it also sets the Move-Wait flag, indicating that new applications can no longer begin an access to the given tuple. In move mode, applications check both the Move-Wait and the Move-Lock fields of the tuple-move table before attempting to access a tuple. When either field is set, in the conservative move mode of process 300, the application attempting an access to the tuple aborts rather than waiting for these locks to be released. For example, at a point 355, an application S1b checks the Move-Wait flag, determines it is set, and consequently aborts, that is, exists without performing the access. When an application aborts, it releases all its locks (the application may retry to access tuples later on after a wait period).

At a point 357, the application S1a clears the A-Lock, allowing the move application to begin moving E1. At a step 360, the move application clears the Move-Wait flag, sets the Move-Lock for E1, and then starts copying E1 to the new locations, as defined by the new group.

At a point 365, another application tries to access E1, but also aborts, because of the Move-Lock.

At a point 370, the move application has completed copying E1 to all the new locations and can remove the M-Lock. First, the move application switches the "In Effect" flag of E1 to indicate that the new location is now the current location. The move application can also delete the data at the old E1 locations. Subsequently, a new user application (indicated as S1f) can again perform an access of E1 (at one of the "In Effect" locations), at a step 375. Because the move mode is still in effect, the application will set the A-Lock. This action, however, no longer interferes with the operation of the move application, which has finished its work on E1. The move application continues to move other tuples in the set E, until all have been moved at a point 380, that is, all have been copied to their new locations, with the old locations being cleared.

At the end of a move operation, when all tuples have been moved, an "end of move" message may also be sent to all active user applications, notifying them to cancel the "move mode" of operation and to resume "normal mode" operation, meaning that they release any locks/flags set in the tuple-move table and no longer set any further such locks or flags. Alternative methods for ceasing the "move mode" operation of user applications may also be implemented, such as having user applications check a move mode status on accessing the tuple-move table. The following optimization may also be employed: once the Move-Lock is removed on tuple Ei, future accesses to Ei by user applications need not set any locks on Ei such that user applications behave as if they are NOT in move mode with respect to Ei. This may be permitted because the given tuple has already been moved and the move application will therefore not access it again during the current move operation.

It should be noted that although process 300 is "conservative" relative to the processes described below, there may be cases in which user applications hold A-mode locks for long durations, which continue after all prior applications have ended. Mechanisms may be required for detecting and aborting such user application. In addition, similar mechanisms may be required for detecting and aborting prior applications that continue to operate for long durations, as these prior applications would prevent the start of the move operation.

To make the Move-Wait and Move-Lock periods short, tuples may be moved together in small sub-groups, an extreme case of such a sub-group being a single tuple. This has the drawback that a large group of tuples will not be together at a new location for a period of time, while each subgroup is being moved at separate intervals. This may affect performance when multiple tuples must be processed together. A sub-group for a partial move may be determined in a number of ways, such as sequentially, by a sort order, or by a physical proximity order within a current group, or by group. In some embodiments, all tuples in groups may be moved together, and a global system variable may be switched from odd to even or vice-versa.

Figure 4:
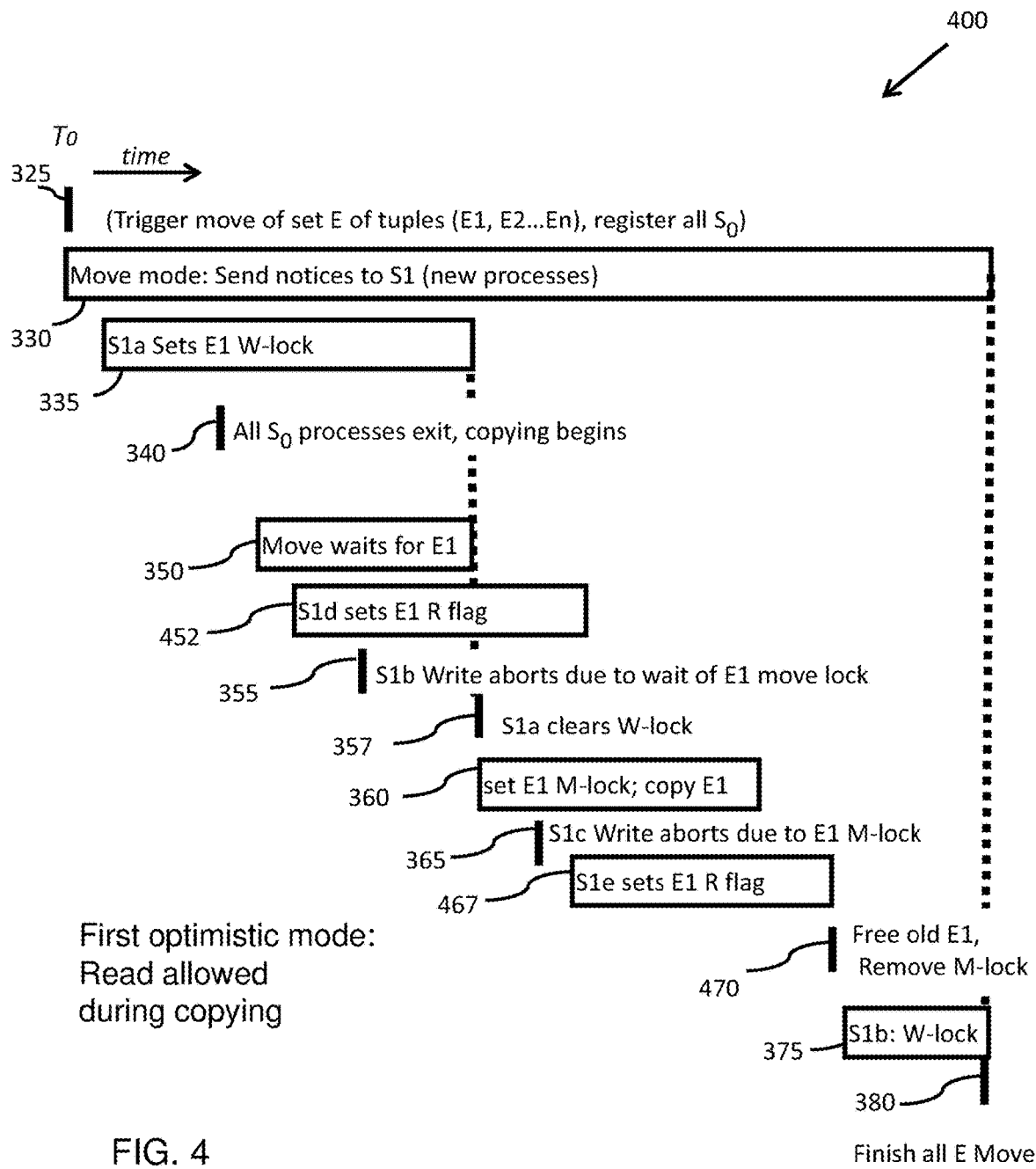
FIG. 4 shows a schematic flow diagram of a first optimistic process for moving replicated, distributed data objects, according to embodiments of the present invention.

FIG. 4 shows a schematic flow diagram of a first optimistic process 400 for moving replicated, distributed data objects, according to embodiments of the present invention. As shown, the process 400 includes most of the same steps and trigger points as the conservative process 300. However, when operating in the "first optimistic move mode", user applications may be given read access, even when the tuples have been set to Move-Wait or Move-Lock modes. By way of example, at a step 452, a user application S1$d$ may initiate a read of tuple E1, recording a read indication of access in the AccessL field, even though the Move-Wait flag is set. The read access by S1$d$ does not interfere with the move application moving a tuple E1. That is, after all prior user applications have exited, the move application may continue to wait for a Write-Lock (TamperL) to be cleared, but not for read indications (AccessL) to clear.

The main impact of allowing read access is that the duration of a read access may extend beyond the time that a move is performed (performed at the step 360). During this time, a read application may still be reading from an old storage location, as indicated by step 467. The step 467 continues to require that S1$d$ have access to the old storage location, even though the tuple has already been copied to all the new locations. The move application therefore must wait before performing the final steps of the tuple move. These steps, subsequently performed at a time 470, after S1$d$ has cleared the read indication, include: freeing the old locations (i.e., deleting the data in the old locations), clearing the Move-Lock, and switching the "In Effect" flag to indicate that the new storage locations are now "current".

The first optimistic mode is "optimistic" compared to the conservative mode, because the read accesses are assumed to be less frequent, so that delays caused by the step 467 type of delayed read accesses are expected to be infrequent.

Figure 5:
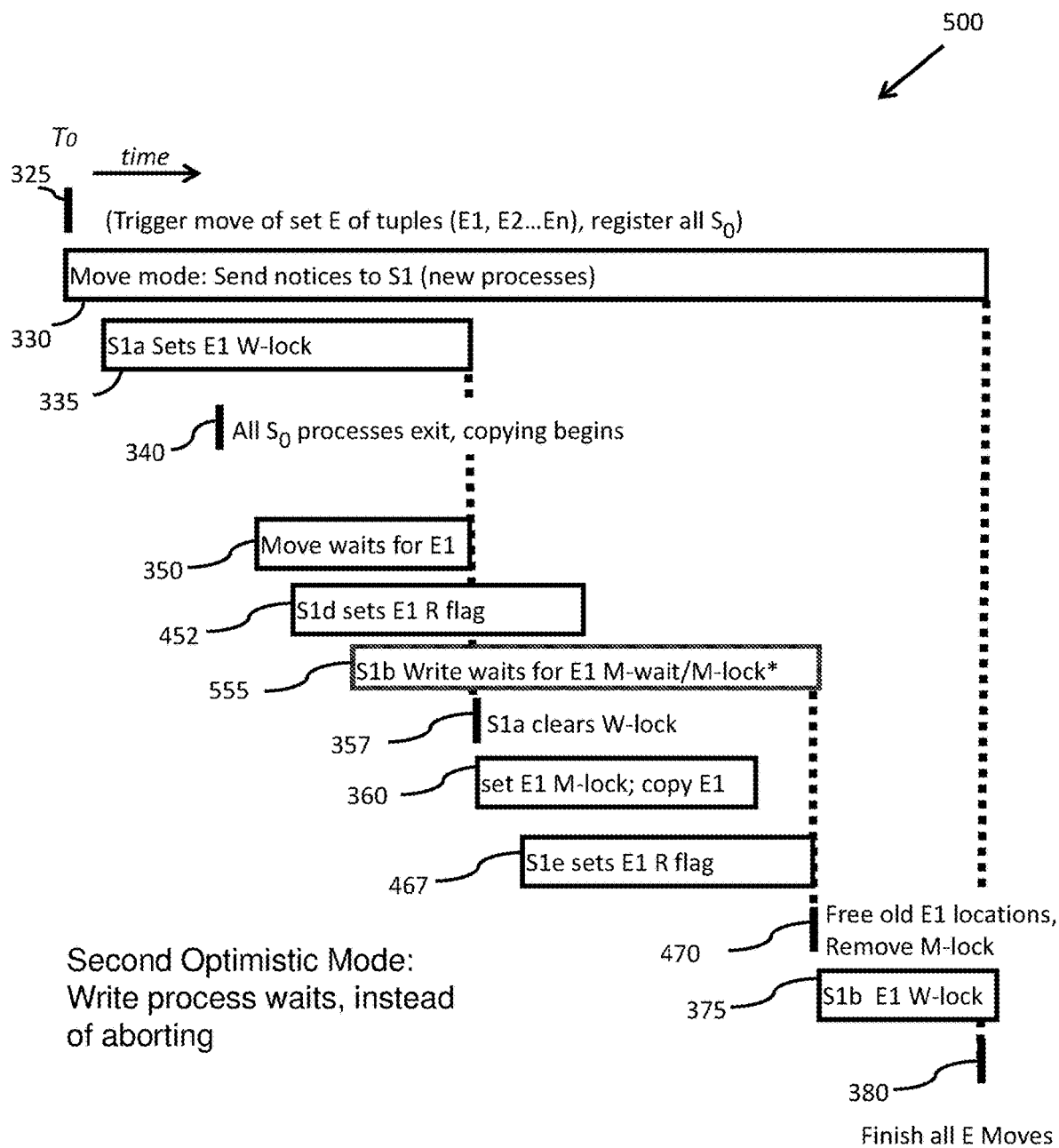
FIG. 5 shows a schematic flow diagram of a second optimistic process for moving replicated, distributed data objects, according to embodiments of the present invention.

FIG. 5 shows a schematic flow diagram of a second optimistic process 500 for moving replicated, distributed data objects, according to embodiments of the present invention. In the process 500, the move application sets a second optimistic move mode, which may be a more appropriate mode for moving tuples than the processes 300 and 400 when read and write access is less frequent than in system that use the processes 300 and 400. In the second optimistic move mode, user applications operate for the most part as they do in the first optimistic move mode, except that attempts at write access during the Move-Wait and Move-Lock stages do not cause a user application to abort. Instead, as indicated by an exemplary step 555, the application simply waits for the Move-Lock to be released. This is "optimistic" in the sense that it assumes that the application has not also set a write-lock at a step 335 on a second tuple. Such a concurrent write-lock may cause a deadlock with the move application, given that the move application might be in a Move-Wait mode waiting for the same second tuple. To avoid this, the user applications, when in the second optimistic move mode, must check that they are not waiting for one tuple while also writing to a second tuple for which the move application is waiting. If the user application is writing to another tuple that has a Move-Wait indication set, then the user application aborts to prevent a deadlock situation.

Figure 6:
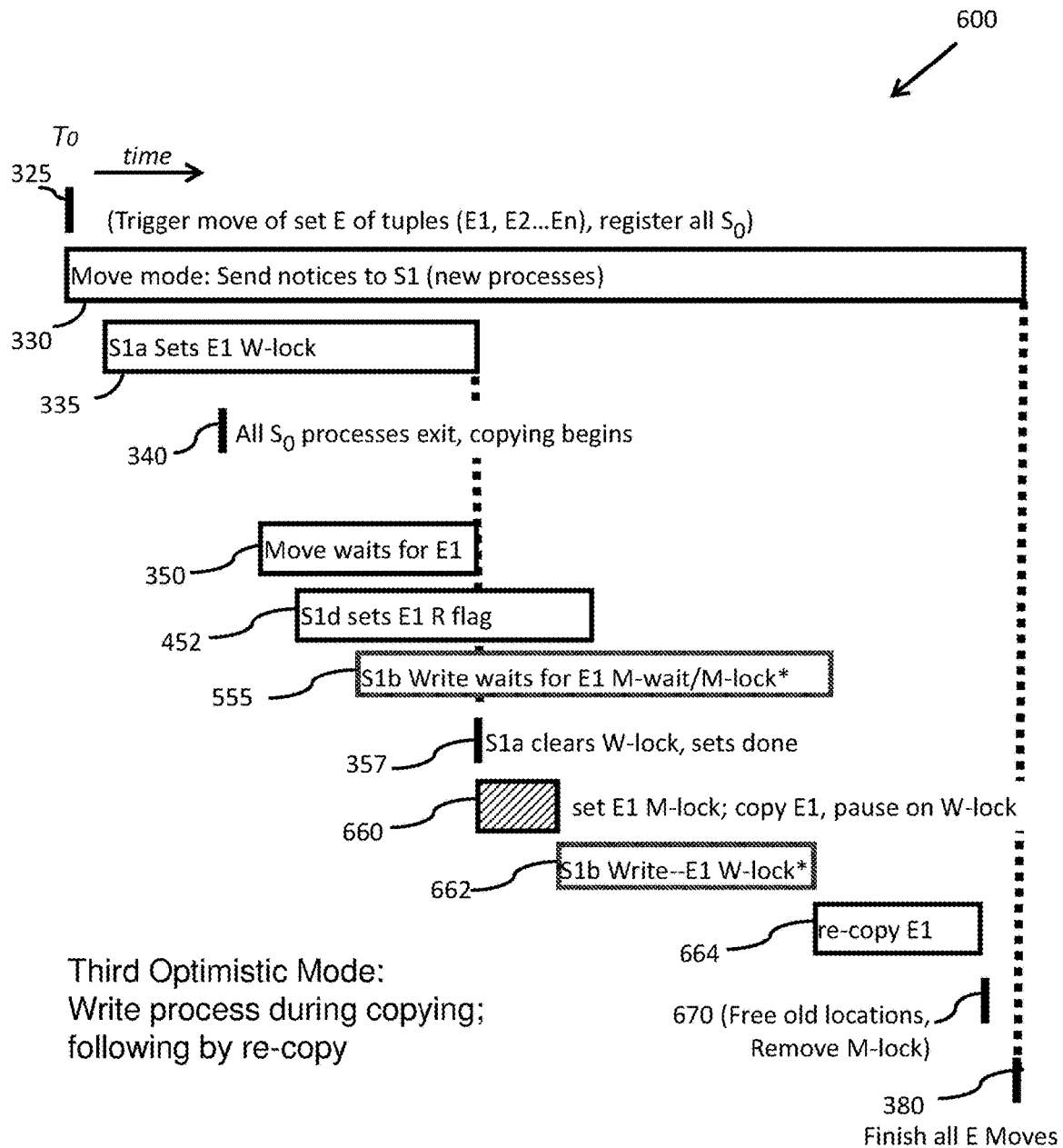
FIG. 6 shows a schematic flow diagram of a third optimistic process for moving replicated, distributed data objects, according to embodiments of the present invention.

FIG. 6 shows a schematic flow diagram of a third optimistic process 600 for moving replicated, distributed data objects, according to embodiments of the present invention. In the third optimistic mode, user applications can interrupt a Move-Lock to gain write access to a tuple, as exemplified by a step 662. At this step, a user application S1$b$ begins a write to the E1 tuple. The application, before writing, sets the Write-Lock indicator (the TamperL field), as described above (if the mode is currently "none" or "done", it is cleared). The move application is configured (that is, programmed) to recognize the setting of the Write-Lock, at which point the move application stops a step 660 of copying the given tuple to its new storage locations, instead abandoning the copying until the Write-Lock is released. During the time of the Write-Lock, the move application can proceed to move other tuples.

When the write operation by the user application is complete, the user application removes the Write-Lock (that is, removes the identifier of the application process and the writing location) in the TamperL field and sets the field to "done" (unless other Write-Locks are pending). The "done" setting is an indication that the write has indeed updated the value of the tuple. (Otherwise, if the user application did not actually update the tuple, and there are no other pending Write-Locks by other user applications, and if TamperL was "none" when first accessed by the user application, the field may be set to "none".) The move application, at a step 664, acts upon the "done" setting, copying the updated value of the tuple to all the new locations. This copying may overwrite copying that was already done during the prior step 660 (i.e., some of the copying is actually re-copying).

Process 600 may be more appropriate for situations in which write operations are less frequent than in the situations handled by processes 300, 400, and 500. Process 600 may also be more appropriate when write operations need to have priority over move operations.

Practitioners in art will recognize that the processes 300, 400, 500 and/or 600 may be further modified in obvious ways. For example, the steps of process 600 that were added to modify process 500 could also be added to processes 300 or 400.

Furthermore, the system may be modified to be integrated into a distributed database system (DDBS) that supports replication, with either of two modifications or a combination of the two:

1) The DDBS may access replicas by calling upon the move application, with an embedded version of the tuple-move table.

2) The DDBS may include an internal component that implements the move application, but can also accessed from outside the DDBS by calling upon DDBS services. Such services may lock tuples within the DDBS by using DDBS locking mechanisms.

To support additional mechanisms for replica updating, synchronization, and transactions, additional columns of the tuple-move table may be added. Alternatively, external mechanisms, such as DDBS transactions mechanisms, may be used.

The order of moving tuples from current groups to new groups may be significant. That is, some tuple moves might have higher priorities than others. The system can estimate the immediate benefits (in both GPP and budget terms) for moving particular tuples or particular current groups. A group or subgroup of tuples that is expected to yield the highest benefit (in terms of GP, budget or some combination thereof) is moved first so that these benefits are realized quickly.

In some embodiments, applications 60 may also be a subset of objects 62, that is, operations to move objects may also be applied to applications (namely, all their code and the code of sub-systems on which they rely, including machine images). The move application 64 may include one or more processes.

It is to be understood that the embodiments described hereinabove are cited by way of example, and that the present invention is not limited to what has been particularly shown and described hereinabove. For example, computer processing elements described may be distributed processing elements, implemented over wired and/or wireless networks. Communications between systems and devices described above are assumed to be performed by software modules and hardware devices known in the art. Processing elements and memory storage, such as databases, may be implemented so as to include security features, such as authentication processes known in the art. The access parameter analyzer 66 may be implemented as a rules engine, and may be developed by methods of machine learning such as decision trees or neural networks. Additional changes and modifications, which do not depart from the teachings of the present invention, will be evident to those skilled in the art.

What is claimed is:

1. A networked computing system comprising at least one processor and a communicatively coupled memory storing instructions that when executed by the at least one processor perform steps of a move operation to move a target object, stored at first storage locations, to second storage locations, wherein the target object is a replicated, distributed tuple, wherein the first and second storage locations store a plurality of objects, wherein the plurality of objects are accessed by user applications, the steps comprising:

triggering a move application to implement the move operation and setting user applications starting execution during the move operation to a move mode, wherein the user applications, only when in the move mode, set read indications and write locks to notify the move application of objects that the user applications access; wherein the move application, before copying the target object, waits for prior user applications, initiated before triggering the move operation, to exit, subsequently waits for all write locks with respect to the target object to be cleared by the user applications that set said write locks, and subsequently sets a move lock to prevent concurrent write access by the user applications;

subsequently, copying the target object to the second storage locations, wherein after copying the target object to the second storage locations, the move application cancels the move lock, after determining that there are no read indications set for the target object; and subsequently cancelling the move mode of the user applications.

2. The system of claim 1, further comprising triggering the move operation responsively to determining that a system performance parameter meets a move criterion such that moving the target object improves at least one of an access delay time, a data security level, a corporate policy for replication, a cost, or performance indicators.

3. The system of claim 1, wherein the target object comprises a plurality of target objects, and wherein cancelling the move mode further comprises waiting to cancel the move mode until all the plurality of target objects are copied to the second storage locations.

4. The system of claim 1, wherein, responsively to the move lock, user applications abort upon attempting to write to the target object.

5. The system of claim 1, wherein the target object is a first target object; wherein, after the prior user applications exit, any user application of the user applications, before writing to the target object, first waits for the move application to copy the target object to the second storage locations; and wherein, while waiting to write, the user application aborts upon determining that the move application is waiting for the user application to clear a write lock set with respect to a second target object.

6. The system of claim 1, wherein cancelling the move mode of the user applications further comprises: updating a location indicator of the target object to indicate that the second storage locations are current locations; and deleting the target object at the first storage locations.

7. The system of claim 1, wherein the target object comprises multiple data tuples defined as a group to be moved together.

8. The system of claim 1, wherein the second storage locations are determined by optimizing a corporate policy including one or more of factors of an allotted budget, storage needs, storage capacities, storage costs, and tradeoffs between the one or more factors.

9. The system of claim 1, wherein when a write lock is set for the target object, the move application proceeds to copying another target object.

10. The system of claim 1, further comprising indicating a current storage location after the move operation by maintaining a current storage indicator in a location table in which old and new locations are maintained by alternating even and odd table entries.

11. The system of claim 1, wherein the plurality of objects are stored by a distributed database system (DDBS) that supports replication.

12. The system of claim 1, wherein the target object includes at least one of the user applications.

13. The system of claim 1, wherein the target object includes multiple target objects and further comprising setting an order for moving the multiple target objects by prioritizing the multiple target objects according to a goal program policy (GPP).

14. A networked computing system comprising at least one processor and a communicatively coupled memory storing instructions that when executed by the at least one processor perform steps of a move operation to move a target object, stored at first storage locations, to second storage locations, wherein the target object is a replicated, distributed tuple, wherein the first and second storage locations store a plurality of objects, wherein the plurality of objects are accessed by user applications, the steps comprising:

triggering a move application to implement the move operation and setting user applications starting execution during the move operation to a move mode, wherein the user applications, only when in the move mode, set read indications and write locks to notify the move application of objects that the user applications access, wherein the move application, before copying the target object, waits for prior user applications, initiated before triggering the move operation, to exit (340), subsequently waits for all write locks with respect to the target object to be cleared by the user applications that set said write locks;

subsequently, beginning to copy the target object to the second storage locations, subsequently detecting a write lock on the target object, wherein the write lock is set by a user application when writing to the target object to create an updated target object, whereupon the move application, upon detecting the write lock, stops copying the target object to the second storage locations; wherein the user application, after writing to the target object, sets a done indication when there are no other user applications writing to the target object; and wherein the move application, responsively to the done indication, copies the updated target object to the second storage locations; and subsequently cancelling the move mode of the user applications.

15. The system of claim 14, wherein cancelling the move mode of the user applications further comprises updating a location indicator of the target object, to indicate that the second storage locations are current locations, and deleting the target object at the first storage locations.

16. The system of claim 14, wherein the target object comprises a plurality of target objects, and wherein cancelling the move mode further comprises waiting to cancel the move mode until all the plurality of target objects are copied to the second storage locations.

17. A computer-based method for performing steps of a move operation to move a target object, stored at multiple first storage locations, to multiple second storage locations, wherein the first and second storage locations store a plurality of objects, wherein the plurality of objects are accessed by user applications, the steps comprising:

triggering a move application to implement the move operation and setting user applications starting execution during the move operation to a move mode, wherein the user applications, only when in the move mode, set read indications and write locks to notify the move application of objects that the user applications access, wherein the move application, before copying the target object, waits for prior user applications, initiated before triggering the move operation, to exit (340), subsequently waits for all write locks with respect to the target object to be cleared by the user applications that set said write locks, and subsequently sets a move lock to prevent concurrent write access by the user applications;

subsequently, copying the target object to the second storage locations, wherein after copying the target object to the second storage locations, the move application cancels the move lock (470), after determining that there are no read indications set for the target object; and subsequently cancelling the move mode of the user applications.

18. The method of claim 17, wherein cancelling the move mode of the user applications further comprises updating a location indicator of the target object, to indicate that the second storage locations are current locations, and deleting the target object at the first storage locations.

19. The method of claim 17, wherein the target object comprises a plurality of target objects, and wherein cancelling the move mode further comprises waiting to cancel the move mode until all the plurality of target objects are copied to the second storage locations.

* * * * *